US010038720B2

(12) United States Patent
Singleton (10) Patent No.: US 10,038,720 B2
(45) Date of Patent: *Jul. 31, 2018

(54) MASTER SECURITY POLICY SERVER (71) Applicant: McAfee, LLC, Plano, TX (US)

(72) Inventor: Richard B. Singleton, Bedfordshire (GB)

(73) Assignee: McAfee, LLC, Plano, TX (US)

(*) Notice: Subject to any disclaimer, the term of this patent is extended or adjusted under 35 U.S.C. 154(b) by 308 days.

This patent is subject to a terminal disclaimer.

(21) Appl. No.: 14/572,328

(22) Filed: Dec. 16, 2014

(65) Prior Publication Data

US 2015/0101015 A1   Apr. 9, 2015

Related U.S. Application Data (63) Continuation of application No. 11/855,963, filed on Sep. 14, 2007, now Pat. No. 8,954,716, which is a
(Continued)

(51) Int. Cl.
G06F 17/00 (2006.01)
H04L 29/06 (2006.01)
(Continued)

(52) U.S. Cl.
CPC ........ H04L 63/20 (2013.01); G06F 17/30174 (2013.01); G06F 21/552 (2013.01); G06F 21/56 (2013.01); G06F 21/57 (2013.01); G06F 21/604 (2013.01); G06F 21/6218 (2013.01); H04L 63/0218 (2013.01); H04L 63/104 (2013.01);
(Continued)

(58) Field of Classification Search
CPC ... H04L 63/20; H04L 63/102; H04L 63/0263; H04L 63/1416; H04L 63/145; H04L 63/1408; G06F 21/56
See application file for complete search history.

(56) References Cited

U.S. PATENT DOCUMENTS 5,796,942 A   8/1998  Esbensen
5,987,610 A  11/1999  Franczek et al.
(Continued)

FOREIGN PATENT DOCUMENTS

WO    WO 00/78004 A   12/2000
WO    WO 2003/029940   4/2003
WO    WO 2003/029941   4/2003

OTHER PUBLICATIONS

USPTO Mar. 14, 2008 Nonfinal Office Action from U.S. Appl. No. 11/855,963.
(Continued)

Primary Examiner — Ali S Abyaneh
(74) Attorney, Agent, or Firm — Patent Capital Group (57) ABSTRACT A master policy server manages security polices for client computers through a network of local policy servers. Each local policy server is responsible for the security policies on a group of clients and maintains a data store containing the security policies and security information pertaining to the clients. Periodically, the master policy server and the local policy server synchronize, at which time the master policy server replicates updated policies to the local policy servers and the local policy servers upload client security statistics to the master policy server for consolidation into a global status.

22 Claims, 5 Drawing Sheets

Related U.S. Application Data continuation of application No. 09/969,686, filed on Oct. 2, 2001, now Pat. No. 8,776,230.

(51) Int. Cl.

| | | |
|---|---|---|
| *G06F 21/55* | | (2013.01) |
| *G06F 21/57* | | (2013.01) |
| *G06F 21/60* | | (2013.01) |
| *G06F 21/62* | | (2013.01) |
| *G06F 17/30* | | (2006.01) |
| *G06F 21/56* | | (2013.01) |

(52) U.S. Cl.
CPC ...... *H04L 63/205* (2013.01); *G06F 2221/034* (2013.01); *G06F 2221/2101* (2013.01)

(56) References Cited

U.S. PATENT DOCUMENTS

| | | | | |
|---|---|---|---|---|
| 6,035,423 | A * | 3/2000 | Hodges | G06F 8/65 709/219 |
| 6,073,142 | A | 6/2000 | Geiger et al. | |
| 6,158,010 | A | 12/2000 | Moriconi et al. | |
| 6,209,101 | B1 | 3/2001 | Mitchem et al. | |
| 6,216,231 | B1 | 4/2001 | Stubblebine | |
| 6,460,050 | B1 | 10/2002 | Pace et al. | |
| 6,487,552 | B1 | 11/2002 | Lei et al. | |
| 6,678,827 | B1 * | 1/2004 | Rothermel | H04L 29/06 709/223 |
| 6,697,857 | B1 | 2/2004 | Dixon et al. | |
| 7,032,022 | B1 * | 4/2006 | Shanumgam | H04L 41/0893 707/999.009 |
| 7,305,562 | B1 | 12/2007 | Bianco et al. | |
| 7,506,155 | B1 | 3/2009 | Stewart et al. | |
| 8,776,230 | B1 | 7/2014 | Singleton | |
| 8,954,716 | B2 | 2/2015 | Singleton | |
| 2001/0007133 | A1 * | 7/2001 | Moriconi | G06F 21/552 726/6 |
| 2002/0048579 | A1 | 4/2002 | Noelle et al. | |
| 2002/0142841 | A1 | 10/2002 | Boushy | |
| 2003/0021283 | A1 * | 1/2003 | See | H04L 41/0213 370/401 |
| 2003/0167418 | A1 | 9/2003 | Zhu et al. | |
| 2004/0049574 | A1 * | 3/2004 | Watson | G06F 17/30905 709/224 |
| 2008/0005780 | A1 | 1/2008 | Singleton | |
| 2015/0106874 | A1 | 4/2015 | Singleton | |

OTHER PUBLICATIONS

USPTO Aug. 7, 2008 Final Office Action from U.S. Appl. No. 11/855,963.
USPTO Oct. 21, 2008 Advisory Action from U.S. Appl. No. 11/855,963.
USPTO Jan. 9, 2009 Nonfinal Office Action from U.S. Appl. No. 11/855,963.
USPTO Jul. 22, 2009 Final Office Action from U.S. Appl. No. 11/855,963.
USPTO Nov. 25, 2009 Nonfinal Office Action from U.S. Appl. No. 11/855,963.
USPTO May 3, 2005 Office Action from U.S. Appl. No. 09/969,686.
USPTO Dec. 23, 2005 Office Action from U.S. Appl. No. 09/969,686.
USPTO May 26, 2010 Final Office Action from U.S. Appl. No. 11/855,963.
USPTO Sep. 15, 2010 Advisory Action from U.S. Appl. No. 11/855,963.
USPTO May 9, 2011 Examiner's Answer to Appeal Brief from U.S. Appl. No. 11/855,963.
ePolicy Orchestrator, Product Guide, Version 2.0, May 2001/ePolicy Orchestrator version 2.0.0, Copyright 2001 Networks Associates Technology, Inc, cover pages, pp. iii-vi, pp. 11, 12, 15 and 16.
ePolicy Orchestrator, A Whole New Level of Anti-Virus Management from McAfee, An Executive White Paper, pp. 1-16, Copyright 2000 Networks Associates Technology, Inc., 6-AVD-EPO-00111/00.
Keeping Passwords in Sync Across Multiple Domains, IBM Technical Disclosure Bulletin, IBM Corp., New York, US, vol. 38, No. 1, 1995, p. 265.
Symantec Corporation, "E-Security Begins with Sound Security Policies," Security, URL:http://enterprisesecurity.symanted.com/SecurityServices/factsheets/esecurityhandbook.pdf, Jun. 14, 2001, pp. 1-20.
Symantec Corporation: "Norton Antivirus Corporation Edition Implementation Guide," Norton Antivirus Corporate Edition 7.0, URL:ftp://symantec.com/public/english_international/Manuals_WhitePapers/navcorped7_ig.pdf, Oct. 12, 1999, pp. 14, 16-32, 45-48, 75-76, 93-94, 107, 143-147, 155-156, 159-160, 183-184.
International Search Report from PCT/US02/28513 dated Feb. 18, 2004.
USPTO Nov. 2, 2012 Decision on Appeal from U.S. Appl. No. 09/969,686.
USPTO May 15, 2013 Nonfinal Office Action from U.S. Appl. No. 09/969,686.
USPTO Sep. 19, 2013 Final Office Action from U.S. Appl. No. 09/969,686.
USPTO Dec. 31, 2013 Advisory Action from U.S. Appl. No. 09/969,686.
USPTO Mar. 6, 2014 Notice of Allowance from U.S. Appl. No. 09/969,686.
USPTO Feb. 28, 2017 Nonfinal Office Action from U.S. Appl. No. 14/572,167, 14 pages.
USPTO Sep. 8, 2017 Final Rejection from U.S. Appl. No. 14/572,167, 17 pages.

\* cited by examiner

MASTER SECURITY POLICY SERVER

RELATED APPLICATIONS

This application is a continuation (and claims the benefit under 35 U.S.C. § 120) of U.S. application Ser. No. 11/855, 963, filed Sep. 14, 2007, by Richard B. Singleton entitled "MASTER SECURITY POLICY SERVER," which is a continuation (and claims the benefit under 35 U.S.C. § 120) of U.S. application Ser. No. 09/969,686, filed Oct. 2, 2001, by Richard B. Singleton entitled "MASTER SECURITY POLICY SERVER." The disclosures of both of the prior applications are considered part of (and are incorporated by reference in) the disclosure of this application in their entireties.

FIELD OF THE INVENTION

This invention relates generally to computer security, and more particularly to managing security policies through a centralized server.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2001, Networks Associates Technology, Inc., All Rights Reserved.

BACKGROUND OF THE INVENTION

Organizations often manage their computer security policies from a central location, typically employing a single computer server to manage the security polices on networked user (client) computers. The clients poll the server several times a day to check for, and optionally download, updated security policies and to upload their status to the server. Assuming a client and the server exchange a large amount of data several times a day, the data traffic between the server and even a small number clients can cause significant degradation for overall network communications.

SUMMARY OF THE INVENTION

A master policy server manages security polices for client computers through a network of local policy servers. Each local policy server is responsible for the security policies on a group of clients and maintains a data store containing the security policies and security information pertaining to the clients. Periodically, the master policy server and the local policy server synchronize, at which time the master policy server replicates updated policies to the local policy servers and the local policy servers upload client security statistics to the master policy server for consolidation into a global status. A local policy server may also request an updated security policy outside of the synchronization timeframe. Similarly, the master policy server may also request the client statistics from a local policy server outside of the synchronization timeframe.

Because the local policy servers consolidate the statistics from the clients prior to uploading it to the master policy server, the amount of data flowing through the network to the master policy server is greatly reduced. Similarly, because the master policy server replicates the security policies to a few local policy servers instead of to each client, the amount of data flowing through the network from the master policy server is also reduced.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

A system level overview of the operation of an embodiment of the invention is described by reference to FIG. 1, which illustrates a security policy distribution system 100. The system 100 utilizes a master policy server 101 to manage security policies on client (user) computers through a network 129 of local policy severs A 103, B 105 and C 107. For example, local policy server A 103 manages client A-1 115 through client A-N 117, while local policy server B 105 manages client B-1 119 through B-N 121. Although the clients are represented as individual systems in FIG. 1, it will be appreciated that they may be grouped together by hardware and software platform type, domain name, site location, or physical or logical region.

Each local policy server has a local data store 109, 111, 113 that contains the security policies and security information collected from the client computers it manages. Each type of hardware and software platform acting as a client computer may be associated with a exemplary security policy or may share exemplary security policies with other platforms. The security policy may contain configuration parameters for anti-virus programs, firewalls, and other security software that protect a client computer from compromise by a third-party.

Communication between the local policy servers 103, 105, 107 and the master policy server 101 through network 129 is intermittent. Each local policy server 103, 105, 107 is responsible for periodically querying the master policy server 101 to determine if the security policies applicable to its clients have changed. The local policy servers also periodically, or upon request, send client security statistics derived from the security information on local data stores 109, 111, 113 to the master policy server 101, which acts as a consolidation point for status information regarding the overall security of the system 100. The statistics from the local policy servers are stored in a global data store 127. When a global status for the system 100 is requested, the master policy server 101 derives the status from the statistics in the global data store 127 and, optionally, from additional statistics obtained from the local policy servers. More detailed status information for particular clients or groups of clients is obtained from the appropriate local policy server.

In one embodiment, the master policy server 101 and the local policy servers 103, 105, 107 synchronize security policies and statistics at times when less data traffic is generally experienced on the network 129. When the local policy servers are physically located in different time zones, the synchronization may occur at several points during a twenty-four hour period. In an alternate embodiment, the local policy servers can schedule checks for updated policies in addition to the synchronization process. Furthermore, it will be appreciated that the synchronization at a local policy server may happen more than once a day. The network 129 connecting the master policy server and the local policy servers is secured using any of several well-known secure transmission protocols when the security policies are being uploaded to the master policy server 101 or replicated to the local policy servers 103, 105, 107. Otherwise, no particular network transmission protocols are required in the system 100.

When the system 100 is installed, the system administrator may create the initial security policies at one of the local policy servers 103, 105, 107 for transfer to the master policy server 101 and subsequent replication to the other local policy servers, or directly at the master policy server 101. Similarly, updates to the security policies may be performed at a local policy server or at the master policy server. In one embodiment, the master policy server 101 maintains global level security policy configurations and the local policy servers 103, 105, 107 derive their local level configuration and set-up policies for their clients from the global level configurations.

The number of local policy servers is dependent upon the number of clients at each site and the physical locations of the sites. Because the master policy server 101 only sends and receives data from the local policy servers 103, 105, 107 instead of each of the clients, a single master policy server and common TCP/IP wide-area networks are generally able to handle the amount of data being transferred in the system 100. Alternate embodiments in which additional levels of servers are incorporated between the local policy servers 103,105, 107 and the master policy server 101 are also contemplated and are considered within the scope of the invention.

Figure 1:
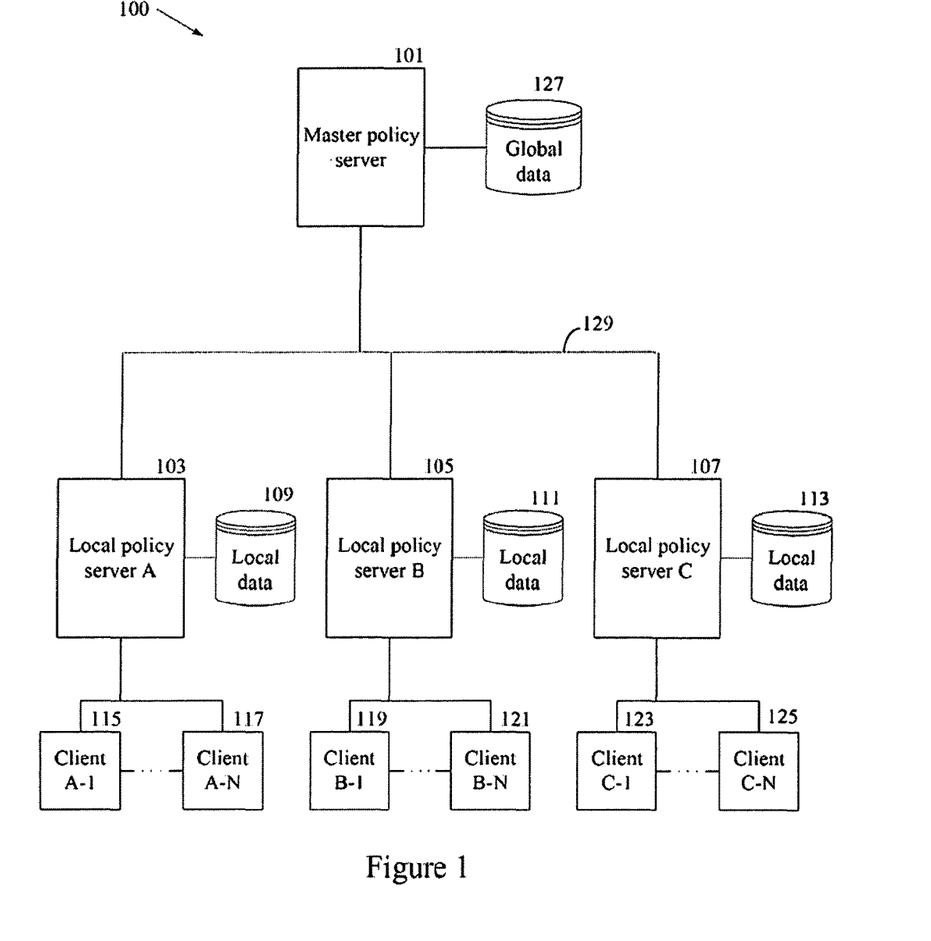
FIG. 1 is a diagram illustrating a system-level overview of an embodiment of the invention.

The operations of an embodiment of a security policy distribution system 100 have been described in terms of a single master policy server and three local policy servers as illustrated in FIG. 1, but the invention is not so limited. Next, the particular methods of the invention that perform the operations for the system 100 are described in terms of computer software with reference to a series of flowcharts. The methods to be performed by a computer constitute computer programs made up of computer-executable instructions illustrated as blocks (acts). Describing the methods by reference to a flowchart enables one skilled in the art to develop such programs including such instructions to carry out the methods on suitably configured computers (the processing unit of the computer executing the instructions from computer-readable media). The computer-executable instructions may be written in a computer programming language or may be embodied in firmware logic. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or a produce a result.

Figure 2A:
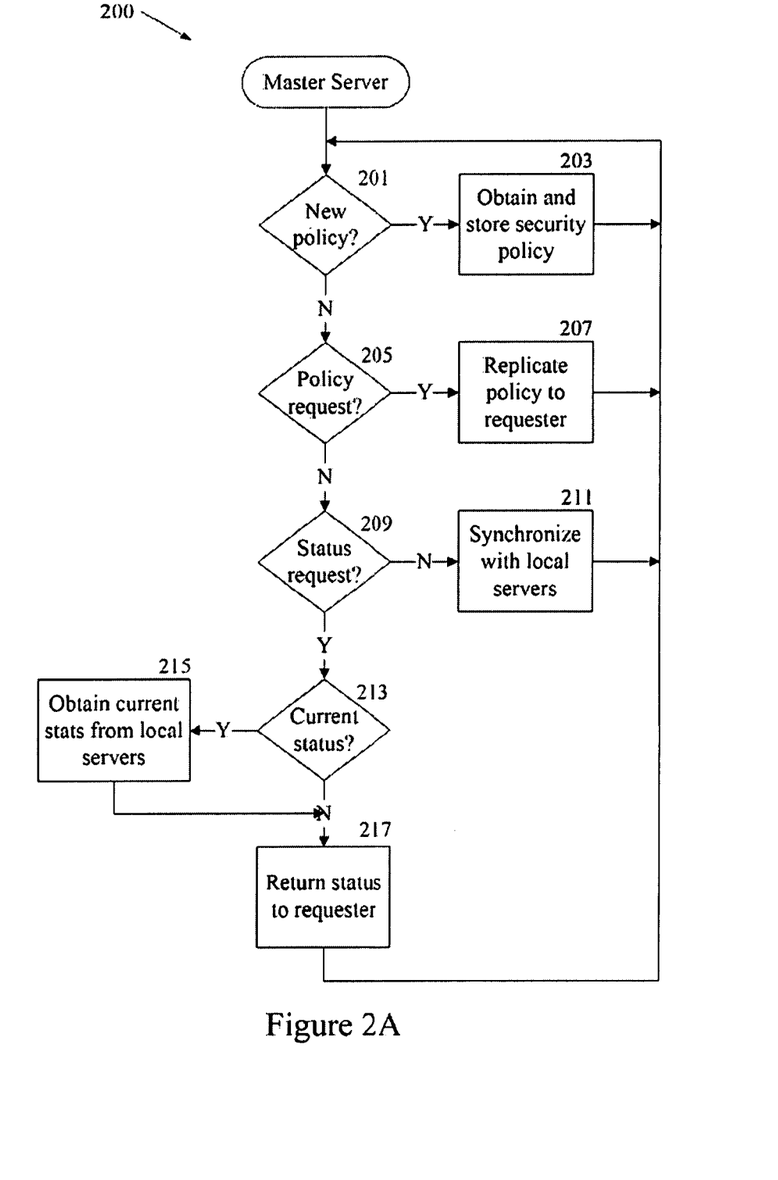
FIG. 2A is a flowchart of a method to be performed by a master server according to an embodiment of the invention.

Referring first to FIG. 2A, the acts to be performed by a computer executing a master server method 200 to perform the operations described for the master policy server 101 in FIG. 1 is shown. The master server method 200 is invoked by one or more of a series of predetermined events. If a new policy has been created, either at the master policy server 101, or at one of the local policy servers, 103, 105, 107, (block 201), the master server method 200 obtains and stores the security policy at block 203. If the master server method 200 receives a request for a new policy from a local policy server (block 205), the master server method 200 replicates the policy to the requestor at block 207. It will be appreciated that the master policy server will replicate those policies which are requested by the local policy server, i.e., those policies particular to the client platforms which the local policy server is managing. If the master server method 200 receives a request for system status (block 209), the master server method 200 determines if the request is for historical or current status (block 213). If the report is for current status, the master server method 200 obtains the current statistics from the local servers at block 215. The appropriate status is returned to the requester at the block 217. Otherwise, the event that invoked the master server method 200 is a scheduled synchronization event and the master server method 200 synchronizes security policies and statistics with the appropriate local policy servers at block 211.

Figure 2B:
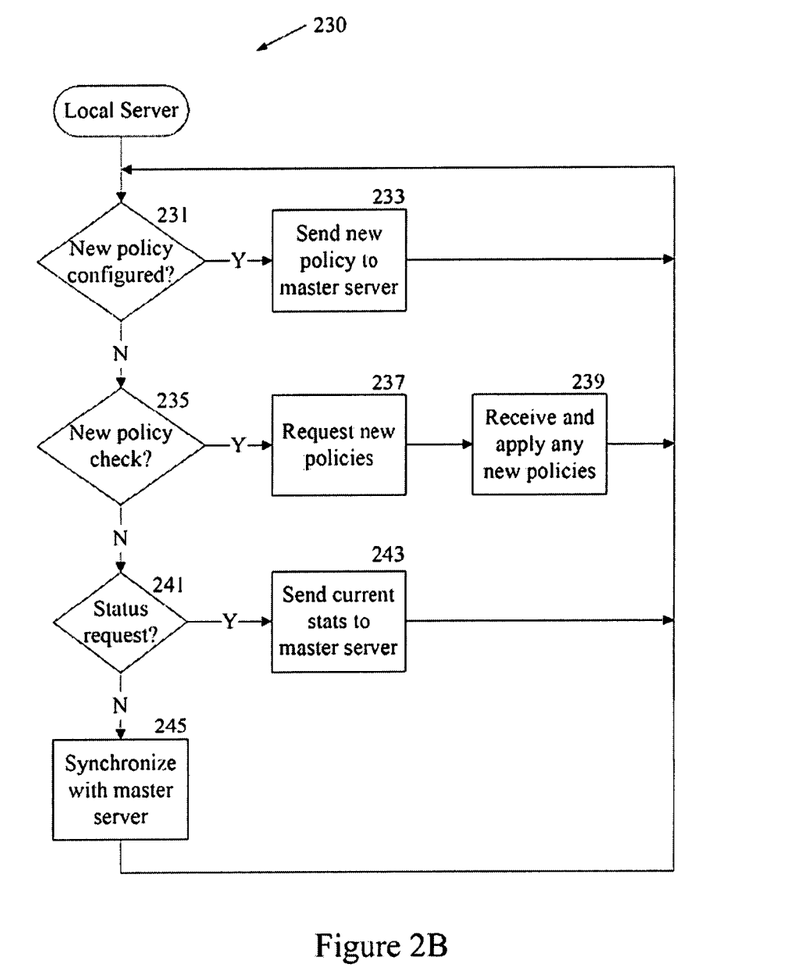
FIG. 2B is a flowchart of a method to be performed by a local server operating in conjunction with the master server of FIG. 2A.

A local server method 230 is illustrated in FIG. 2B that performs the operations previously described for the local policy servers 103, 105, 107 in FIG. 1. As with the master server method 200, the local server method 230 is invoked by one or more of a predetermined sequence of events. If a new policy has been configured on the local policy server (block 231), the local server method 230 sends the new policy to the master policy server at block 233 for replication to the other local policy servers. If the event is a scheduled check for the availability of new policies (block 235), the local server method 230 requests appropriate new policies from the master policy server at block 237 and receive and apply any new policies at block 239. If the local server method 230 receives a request for current status from the master server method 200 (block 241), it send its current statistics to the master policy server at block 243. Otherwise, the event is a scheduled synchronization event and the local server method 230 synchronizes with the master policy server at block 245, sending statistics from the local data store to the master policy server and receiving any updates to the security policies.

The methods performed by a master policy server and local policy server have been shown by reference to flowcharts in FIGS. 2A and 2B, respectively, including all the acts from 201 until 217 and from 231 until 245. It will be appreciated that more or fewer processes may be incorporated into the methods illustrated in FIGS. 2A-8 without departing from the scope of the invention, and that no particular order is implied by the arrangement of blocks shown and described herein.

Figure 3A:
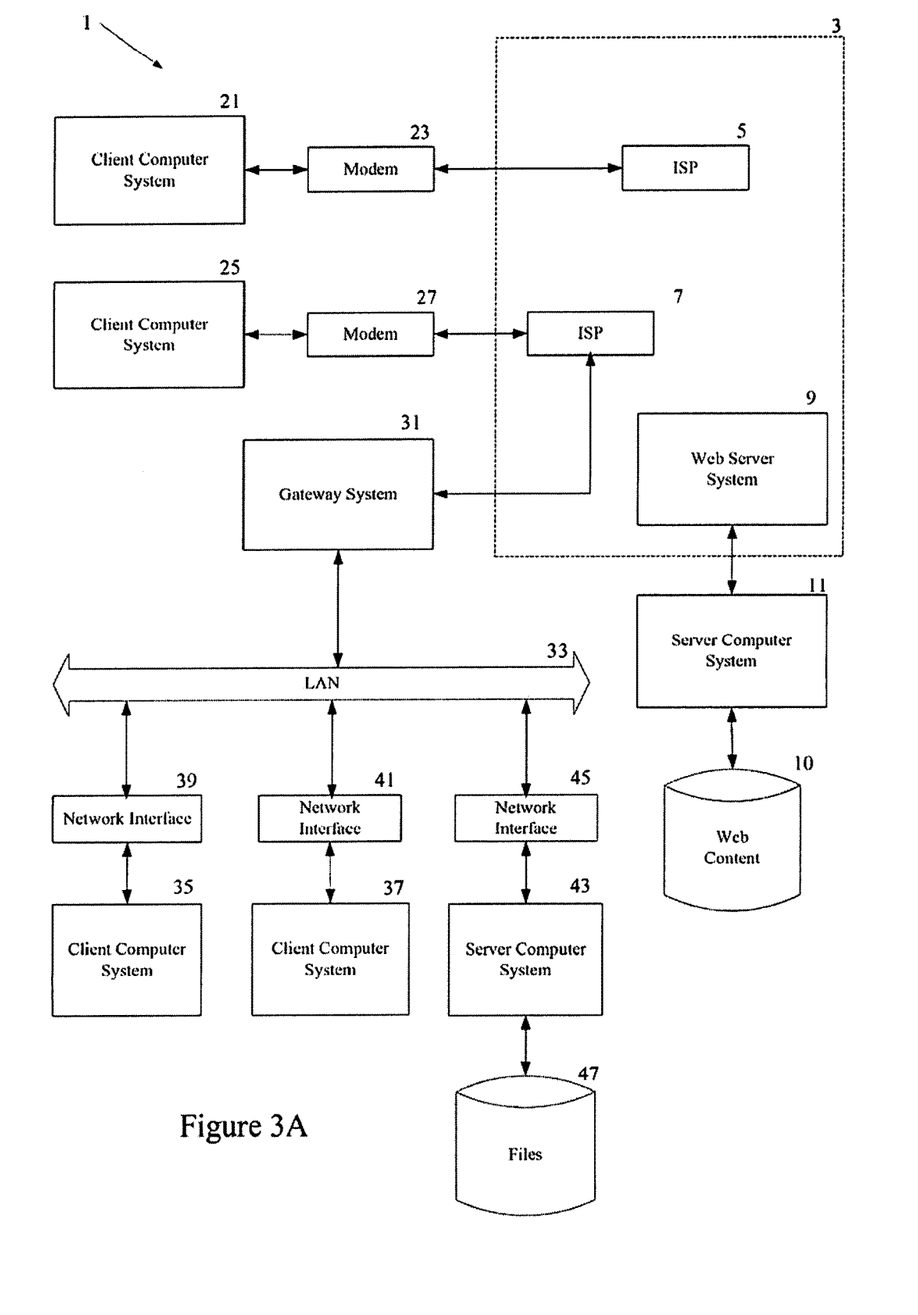
FIG. 3A is a diagram of one embodiment of an operating environment suitable for practicing the present invention.
Figure 3B:
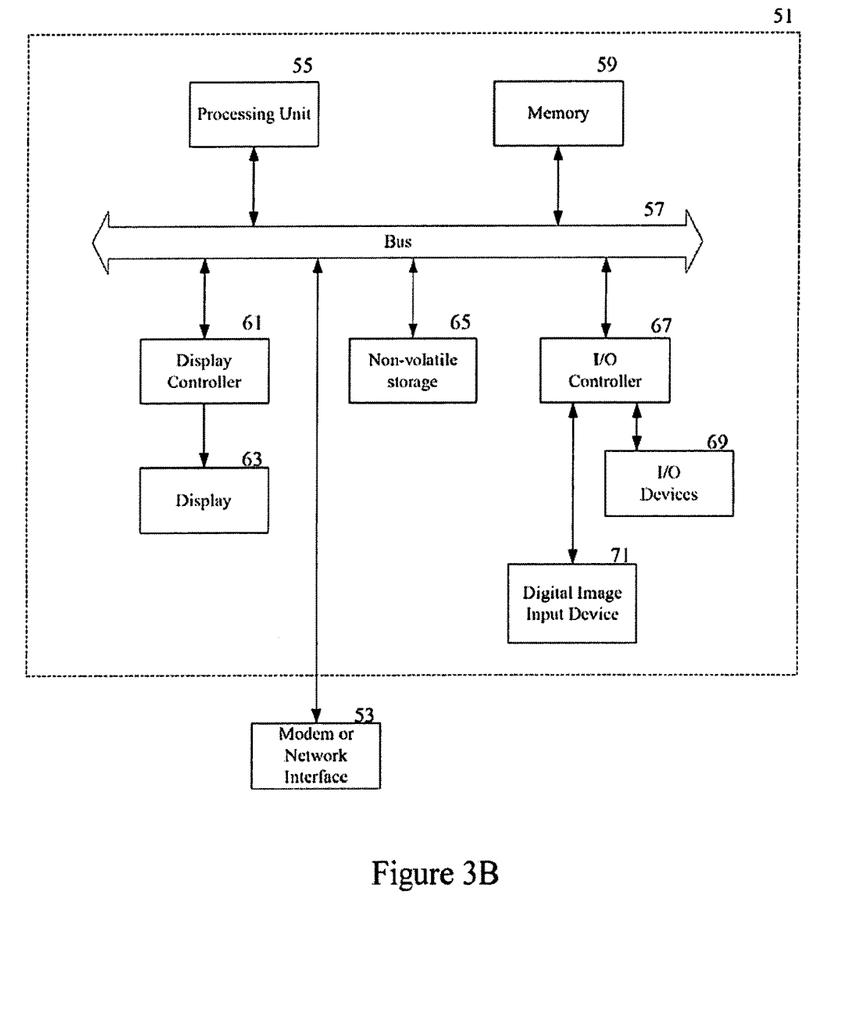
FIG. 3B is a diagram of one embodiment of a computer system suitable for use in the operating environment of FIG. 3A.

The following description of FIGS. 3A-B is intended to provide an overview of computer hardware and other operating components suitable for performing the methods of the invention described above, but is not intended to limit the applicable environments. One of skill in the art will immediately appreciate that the invention can be practiced with other computer system configurations, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network.

FIG. 3A shows several computer systems that are coupled together through a network 3, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet 3 is typically provided by Internet service providers (ISP), such as the ISPs 5 and 7. Users on client systems, such as client computer systems 21, 25, 35, and 37 obtain access to the Internet through the Internet service providers, such as ISPs 5 and 7. Access to the Internet allows users of the client computer systems to exchange information, receive and send e-mails, and view documents, such as documents which have been prepared in the HTML format. These documents are often provided by web servers, such as web server 9 which is considered to be "on" the Internet. Often these web servers are provided by the ISPs, such as ISP 5, although a computer system can be set up and connected to the Internet without that system being also an ISP as is well known in the art.

The web server 9 is typically at least one computer system which operates as a server computer system and is configured to operate with the protocols of the World Wide Web and is coupled to the Internet. Optionally, the web server 9 can be part of an ISP which provides access to the Internet for client systems. The web server 9 is shown coupled to the server computer system 11 which itself is coupled to web content 10, which can be considered a form of a media database. It will be appreciated that while two computer systems 9 and 11 are shown in FIG. 3A, the web server system 9 and the server computer system 11 can be one computer system having different software components providing the web server functionality and the server functionality provided by the server computer system 11 which will be described further below.

Client computer systems 21, 25, 35, and 37 can each, with the appropriate web browsing software, view HTML pages provided by the web server 9. The ISP 5 provides Internet connectivity to the client computer system 21 through the modem interface 23 which can be considered part of the client computer system 21. The client computer system can be a personal computer system, a network computer, a Web TV system, or other such computer system. Similarly, the ISP 7 provides Internet connectivity for client systems 25, 35, and 37, although as shown in FIG. 3A, the connections are not the same for these three computer systems. Client computer system 25 is coupled through a modem interface 27 while client computer systems 35 and 37 are part of a LAN. While FIG. 3A shows the interfaces 23 and 27 as generically as a "modem," it will be appreciated that each of these interfaces can be an analog modem, ISDN modem, cable modem, satellite transmission interface (e.g. "Direct PC"), or other interfaces for coupling a computer system to other computer systems. Client computer systems 35 and 37 are coupled to a LAN 33 through network interfaces 39 and 41, which can be Ethernet network or other network interfaces. The LAN 33 is also coupled to a gateway computer system 31 which can provide firewall and other Internet related services for the local area network. This gateway computer system 31 is coupled to the ISP 7 to provide Internet connectivity to the client computer systems 35 and 37. The gateway computer system 31 can be a conventional server computer system. Also, the web server system 9 can be a conventional server computer system.

Alternatively, as well-known, a server computer system 43 can be directly coupled to the LAN 33 through a network interface 45 to provide files 47 and other services to the clients 35, 37, without the need to connect to the Internet through the gateway system 31.

FIG. 3B shows one example of a conventional computer system that can be used as a client computer system or a server computer system or as a web server system. It will also be appreciated that such a computer system can be used to perform many of the functions of an Internet service provider, such as ISP 5. The computer system 51 interfaces to external systems through the modem or network interface 53. It will be appreciated that the modem or network interface 53 can be considered to be part of the computer system 51. This interface 53 can be an analog modem, ISDN modem, cable modem, token ring interface, satellite transmission interface (e.g. "Direct PC"), or other interfaces for coupling a computer system to other computer systems. The computer system 51 includes a processing unit 55, which can be a conventional microprocessor such as an Intel Pentium microprocessor or Motorola Power PC microprocessor. Memory 59 is coupled to the processor 55 by a bus 57. Memory 59 can be dynamic random access memory (DRAM) and can also include static RAM (SRAM). The bus 57 couples the processor 55 to the memory 59 and also to non-volatile storage 65 and to display controller 61 and to the input/output (I/O) controller 67. The display controller 61 controls in the conventional manner a display on a display device 63 which can be a cathode ray tube (CRT) or liquid crystal display. The input/output devices 69 can include a keyboard, disk drives, printers, a scanner, and other input and output devices, including a mouse or other pointing device. The display controller 61 and the I/O controller 67 can be implemented with conventional well known technology. A digital image input device 71 can be a digital camera which is coupled to the I/O controller 67 in order to allow images from the digital camera to be input into the computer system 51. The non-volatile storage 65 is often a magnetic hard disk, an optical disk, or another form of storage for large amounts of data. Some of this data is often written, by a direct memory access process, into memory 59 during execution of software in the computer system 51. One of skill in the art will immediately recognize that the term "computer-readable medium" includes any type of storage device that is accessible by the processor 55 and also encompasses a carrier wave that encodes a data signal.

It will be appreciated that the computer system 51 is one example of many possible computer systems which have different architectures. For example, personal computers based on an Intel microprocessor often have multiple buses, one of which can be an input/output (I/O) bus for the peripherals and one that directly connects the processor 55 and the memory 59 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 59 for execution by the processor 55. A Web TV system, which is known in the art, is also considered to be a computer system according to the present invention, but it may lack some of the features shown in FIG. 3B, such as certain input or output devices. A typical computer system will usually include at least a processor, memory, and a bus coupling the memory to the processor.

It will also be appreciated that the computer system 51 is controlled by operating system software which includes a file management system, such as a disk operating system, which is part of the operating system software. One example of an operating system software with its associated file management system software is the family of operating systems known as Windows® from Microsoft Corporation of Redmond, Wash., and their associated file management systems. The file management system is typically stored in the non-volatile storage 65 and causes the processor 55 to execute the various acts required by the operating system to input and output data and to store data in memory, including storing files on the non-volatile storage 65.

A security policy distribution system that is managed by a master security policy server has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application with respect to network communications is meant to include all communication media and environments, including local and wide area networks, public and private communications environments, and wired and wireless communications media. Therefore, it is manifestly intended that this invention be limited only by the following claims and equivalents thereof.

What is claimed is:

1. At least one non-transitory computer storage medium to store at least one computer program product, the computer program product comprising:

computer code to create a plurality of security policies at a first policy server;

computer code to maintain the plurality of security policies at the first policy server;

computer code to manage, by a second policy server, security for a plurality of client platforms, each client platform to operate security software that includes anti-virus and firewall software;

the managing to include retrieval, from a master policy server, of one or more of the plurality of security policies created by the first policy server and application of one or more of the plurality of security policies to each of the plurality of client platforms according to hardware platform type;

computer code to provide at least one security statistic about one or more of the plurality of client platforms to the first policy server from the second policy server; and computer code to derive a global status based on the at least one security statistic.

2. The computer program product of claim 1, further comprising:

computer code to periodically synchronize the first policy server and the second policy server to replicate the security policies at the second policy server.

3. The computer program product of claim 2, wherein the security policies replicated during synchronization include at least one updated policy.

4. The computer program product of claim 1, wherein the security policies include configuration parameters for the anti-virus and firewall software.

5. The computer program product of claim 1, further comprising:

computer code to periodically query, by the second policy server, the first policy server to determine if one or more of the plurality of security policies applied to each client platform has been updated.

6. The computer program product of claim 5, further comprising:

computer code to replicate the updated versions of one or more of the plurality of security policies at the second policy server responsive to a determination that the one or more of the plurality of security policies applied to each client platform has been updated.

7. The computer program product of claim 6, further comprising:

computer code to apply, by the second policy server, the updated versions of the one or more of the plurality of security policies to one or more of the plurality of client platforms.

8. The computer program product of claim 1, wherein the plurality of security policies include global level security policy configurations.

9. The computer program product of claim 8, further comprising:

computer code to derive, by the second policy server, local level security policy configurations for each client platform from the global level security policy configurations.

10. The computer program product of claim 1, further comprising:

computer code to receive, by the second policy server, a request for the at least one security statistic from the first policy server.

11. The computer program product of claim 1, further comprising:

computer code to send, by the first policy server, the global status to a requester.

12. A system for managing security policies, the system comprising:
   a first policy computer server, the first policy computer server configured to:
      create a plurality of security policies; and
      maintain the plurality of security policies;
   a second policy computer server, the second policy computer server configured to:
      manage security for a plurality of client platforms, each client platform to operate security software that includes anti-virus and firewall software;
      the managing to include retrieval, from a master policy server, of one or more of the plurality of security policies created by the first policy computer server and application of one or more of the plurality of security policies to each of the plurality of client platforms according to hardware platform type; and
      provide at least one security statistic about one or more of the plurality of client platforms to the first policy computer server; and
   wherein the first policy computer server is further configured to derive a global status based on the at least one security statistic.

13. The system of claim 12, wherein the first policy computer server is further configured to periodically synchronize the first policy computer server and the second policy computer server to replicate the security policies at the second policy computer server.

14. The system of claim 13, wherein the security policies replicated during synchronization include at least one updated policy.

15. The system of claim 12, wherein the security policies include configuration parameters for the anti-virus and firewall software.

16. The system of claim 12, wherein the second policy computer server is further configured to periodically query the first policy computer server to determine if the one or more of the plurality of security policies applied to each client platform has been updated.

17. The system of claim 16, wherein the first policy computer server is further configured to replicate updated versions of the one or more of the plurality of security policies at the second policy computer server responsive to a determination that the one or more of the plurality of security policies applied to each client platform has been updated.

18. The system of claim 17, further comprising wherein the second policy computer server is further configured to apply the updated versions of the one or more of the plurality of security policies to one or more of the plurality of client platforms.

19. The system of claim 12, wherein the plurality of security policies include global level security policy configurations.

20. The system of claim 19, wherein the second policy computer server is further configured to derive local level security policy configurations for each client platform from the global level security policy configurations.

21. The system of claim 12, wherein the second policy computer server is further configured to receive a request for the at least one security statistic from the first policy computer server.

22. The system of claim 12, wherein the first policy computer server is further configured to send the global status to a requester.

* * * * *

UNITED STATES PATENT AND TRADEMARK OFFICE
CERTIFICATE OF CORRECTION

PATENT NO. : 10,038,720 B2
APPLICATION NO. : 14/572328
DATED : July 31, 2018
INVENTOR(S) : Richard B. Singleton It is certified that error appears in the above-identified patent and that said Letters Patent is hereby corrected as shown below:

In the Claims

In Column 8, Line 41, in Claim 6, after "replicate" delete "the".

In Column 8, Line 41, in Claim 6, after "of" insert -- the --.

Signed and Sealed this
Eleventh Day of December, 2018

Andrei Iancu
*Director of the United States Patent and Trademark Office*